UNITED STATES PATENT OFFICE.

JOSEPH KEMPNER, OF GOERLITZ, GERMANY.

PRODUCING OPALESCENT GLASS.

SPECIFICATION forming part of Letters Patent No. 468,723, dated February 9, 1892.

Application filed April 29, 1891. Serial No. 390,986. (No specimens.) Patented in England February 18, 1890, No. 2,626, and in Belgium February 21, 1890, No. 67,129.

*To all whom it may concern:*

Be it known that I, JOSEPH KEMPNER, a subject of the Emperor of Germany, residing at Goerlitz, Germany, have invented certain new and useful Improvements in Producing Opalescent Glass from a Glass Mixture Containing Silicofluorides of Alkalies or Compounds Thereof, (for which I have received Letters Patent in England No. 2,626, dated February 18, 1890, and in Belgium No. 67,129, dated February 21, 1890;) and I do hereby declare that the following is a full, clear, and exact description of the invention, which will enable others skilled in the art to which it appertains to make and use the same.

This invention is a new process derived from melting experiments for producing opalescent glass. Said experiments have demonstrated that fluorides of alkalies alone do not produce opalescent glass, which fact is also established by other tests, (vide *Dingler's Polytechnisches Journal*, Vol. 256, p. 361, 1885;) that even cryolite produces opalescent glass only if added in a large proportion; that, however, silicofluorides of alkalies (silicofluoride of sodium or silicofluoride of potassium) or compounds thereof, when added in a relatively small quantity to a glass batch of any suitable composition, produce an intensely opalescent glass. I have found that when adding to three equal batches of the same composition, respectively, ten grams of fluoride of sodium, cryolite, and silicofluoride of sodium the first two mixtures resulted in a perfectly clear white glass, but the third mixture containing silicofluoride of sodium in a completely milky opalescent glass.

When making batches for an opalescent glass in glass-works, the proportion of silicofluoride of alkali to be incorporated will naturally depend on the nature of the substances constituting the glass batch, on the temperature of the furnace, and on the degree of dullness desired to be produced. If, for instance, in an ordinary cryolite opalescent glass batch consisting of thirty units of cryolite, forty-six units of carbonate of soda, twelve units of chalk, and one hundred and sixty-five units of sand the cryolite is replaced by twenty-five units of silicofluoride of sodium and eventually twenty units of kaolin, a glass perfectly equal to cryolite opalescent glass is obtained. The kaolin, however, is not absolutely necessary; but any other aluminiferous mineral may be substituted therefor, as it merely serves to produce a glass similar to cryolite.

Silicofluorides of alkalies may also be advantageously employed for enriching any opalescent glass batches. In the batch above referred to, for instance, fifteen units of the cryolite contained therein may be replaced by silicofluoride of alkali. The batch, which would then be composed of fifteen units of cryolite, forty-six units of carbonate of soda, twelve units of chalk, one hundred and sixty-five units of sand, and twelve and a half units of silicofluoride of sodium, results in an opalescent glass which is at least as good as if only cryolite had been employed. The action of the silicofluoride of alkali is quite different from the action of a union of the ingredients constituting chemically the silicofluoride of alkali. With the exception of cryolite it is impossible, owing to the absolute absence of other raw material, to use anything but silicic acid as source of silicium. Silicic acid, however, melted together with bases will never result in anything but silicates of bases, no matter whether or not a fluor compound is present. For a combination, for instance, to silicic fluoride of sodium a reduction to silicium would be required, which, however, is known not to occur under these circumstances. Consequently fluosilicates of alkalies are only obtained by chemical combination of fluosilicic acid with an alkali or by alternate decomposition in solutions, but never by the combination of the elements silicium, fluor, and sodium. Especially fluosilicate of alkali has never yet been obtained by the action of high temperatures on mixtures of compounds of silicium, fluor, and alkali. Such colliquefactions, therefore, do not result in fluosilicate of alkali, as, when melting the said compounds together, no hyperfluoride of silicium is produced, while with dry heating of fluosilicates of metals hyperfluoride of silicium escapes. It is just the energetic action of this gas constant at a high temperature on the other constituents of the glass batch which effects the addling. If, therefore, no hyperfluoride of silicium escapes when smelting together compounds of silicium, fluor, and alkali, the addling process, according to my method, is totally different, as in my process the hyperfluoride of silicium is the most essential part.

Having fully described my invention, what I claim, and desire to secure by Letters Patent, is—

A glass batch consisting of twenty-five units of silicofluoride of sodium, forty-six units of carbonate of soda, twelve units of chalk, and one hundred and sixty-five units of sand, or substantially these proportions, combined for producing opalescent glass, as set forth.

JOSEPH KEMPNER

Witnesses:
PAUL DRUCKMÜLLER,
EMIL DOMSCH.